United States Patent
Khlat (10) Patent No.: US 7,158,578 B2
(45) Date of Patent: Jan. 2, 2007

(54) QUADRATURE MODULATOR WITH PULSE-SHAPING

(75) Inventor: Nadim Khlat, Cugnaux (FR)

(73) Assignee: Freescale Semiconductor, Inc., Austin, TX (US)

( * ) Notice: Subject to any disclaimer, the term of this patent is extended or adjusted under 35 U.S.C. 154(b) by 749 days.

(21) Appl. No.: 10/451,094

(22) PCT Filed: Oct. 8, 2001

(86) PCT No.: PCT/EP01/11563

§ 371 (c)(1),
(2), (4) Date: Jun. 18, 2003

(87) PCT Pub. No.: WO02/51083

PCT Pub. Date: Jun. 27, 2002

(65) Prior Publication Data

US 2004/0041644 A1    Mar. 4, 2004

(30) Foreign Application Priority Data

Dec. 20, 2000    (EP) .................................. 00403609

(51) Int. Cl.
*H04L 5/12*    (2006.01)
*H03H 7/40*    (2006.01)
(52) U.S. Cl. ...................... 375/261; 375/298; 375/235
(58) Field of Classification Search ................ 375/229, 375/230, 232, 235, 236, 261, 295, 298; 708/300, 708/322; 332/103
See application file for complete search history.

(56) References Cited

U.S. PATENT DOCUMENTS

| 5,270,953 | A |   | 12/1993 | White |
| 5,870,431 | A | * | 2/1999 | Easton et al. ................ 375/230 |
| 6,031,431 | A |   | 2/2000 | Vinekar |
| 6,570,907 | B1 | * | 5/2003 | Dent et al. ................... 375/130 |

FOREIGN PATENT DOCUMENTS

| EP | 0 881 764 | 12/1998 |
| WO | WO93/00737 | 1/1993 |

OTHER PUBLICATIONS

PCT/EP01/11563 International Search Report mailed Mar. 14, 2002.

* cited by examiner

*Primary Examiner*—Dac V. Ha

(57) ABSTRACT

An IQ modulator and method for modulating a signal in accordance with I and Q symbols using derivative FIR's operating at the symbol rate and programmable multi-accumulators for waveform generator.

This provides advantages that reduced complexity is produced compared with traditional FIR's by a factor equal to the quotient of oversampling ratio and derivative order; programmability to Digital Very Low IF mode transmission is possible; the same circuit may perform interpolation for narrow band MA's; and reduced sets of coefficients enable implementation of two sets of coefficients for MA's, allowing fast handover between MA's such as EDGE and IS136.

16 Claims, 6 Drawing Sheets

QUADRATURE MODULATOR WITH PULSE-SHAPING

FIELD OF THE INVENTION

This invention relates to IQ (In-phase component and Quadrature-phase component) modulation of signals, and particularly though not exclusively to IQ modulation in wireless transmitters for communications systems such as cellular communications systems.

IQ modulators are commonly found in wireless transmitter applications providing multimode modulations, i.e., modulations in a desired one of multiple modes such as EDGE (Enhanced Data-rates for GSM Evolution), IS136 (Second generation TDMA air interface standard), IDEN (Integrated Digital Enhanced Network), ICO (Intermediate Circular Orbit), IS95 (CDMA air interface standard) and other schemes using linear modulation.

BACKGROUND OF THE INVENTION

In the field of this invention it is known that IQ modulation may be performed by using finite impulse response filters (FIR's) operating at an oversampling ratio (of the sampling rate of the I and Q samples) with coefficients equal in number to the product of the oversampling ratio and the span length times of the I and Q samples.

It is desirable to provide a low cost and programmable modulator to handle particularly the following different operating modes (MA's):
  EDGE in DCR (Direct Conversion Receiver) or DVLIF (Digital Very-Low Intermediate Frequency) modes with high oversampling clocks
  IDEN and IS136 in interpolation modes with high oversampling clocks
  IS95 in DCR mode with high oversampling clocks
In order to meet the requirements of low cost and programmability, such a modulator should have:
  low integrated circuit (IC) gate count;
  high oversampling ratio (e.g., greater than 4);
  reduced sets of coefficients for software transmitter (TX) handover between MA's without IC re-programming.
  low power consumption
However, such combined requirements have been difficult to meet.

A need therefore exists for an IQ modulator and method wherein the abovementioned disadvantage(s) may be alleviated.

Prior Art

U.S. Pat. No. 6,031,431 (Sanjay) discloses a simplified IQ modulator and method. A Nyquist filter is used with an interpolator. This performs both pulse shaping and interpolation functions.

European Patent Application EP-A-0881 764 (Commquest) describes a method for variable-rate down sampling. An anti aliasing filter matches the sampling rate and a frequency controlled oscillator ensues that frequency synthesis is maintained in the digital domain.

Statement of Invention

In accordance with the present invention there is provided an IQ modulator and method as claimed in claim 1 and claim 10 respectively.

BRIEF DESCRIPTION OF THE DRAWINGS

One digital pulse-shaping multi-accumulator waveform generator incorporating an IQ modulator according to the present invention will now be described, by way of example only, with reference to the accompanying drawings, in which.

DESCRIPTION OF PREFERRED EMBODIMENTS

In a preferred IQ modulator for a low-cost re-programmable IC implementation for portable cellular applications, a multi-accumulator polynomial generator is used. Use of the multi-accumulator polynomial generator allows any desired type of pulse-shaping filter to be achieved, the impulse response on each symbol period being approximated by a $4^{th}$ order polynomial expression, where the coefficients of each of the four orders is expressed as X1d(i), X2d(i), X3d(i) and X4d(i), where i is the corresponding symbol period index. Rather than having finite impulse response filters (FIR's) operating at the oversampling ratio, they operate at the symbol period 1X.

Figure 1:
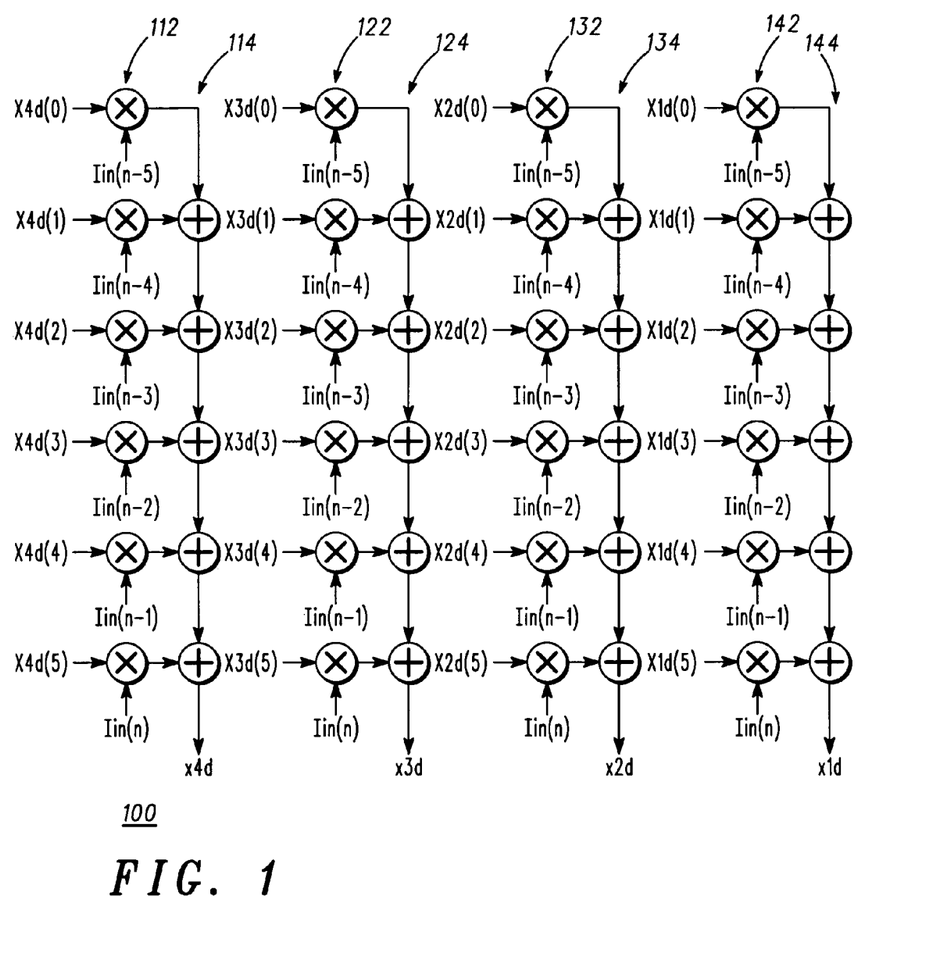
FIG. 1 shows a block schematic diagram of a signal processing flow for a FIR for use in EDGE mode IQ modulation in the multi-accumulator waveform generator incorporating the present invention.

FIG. 1 shows the signal processing flow for producing the filter coefficients for such a $4^{th}$ order FIR operating at the symbol period 1X.

For example, in EDGE mode, the impulse response span over 5 symbol periods, so only 5 taps per FIR are required, resulting in complexity equal to 5*270.8333*4=5410 kilo-operations per second (270.8333 ksym/s being the required EDGE symbol period); in North American Digital Cellular (NADC) mode, the impulse response spans over 9 symbol periods, so 9taps per FIR is required, resulting in complexity equal to 9*24.3:*4=874.8 kilo-operations per second (24.3 ksym/s being the required NADC symbol period).

More generally, it will be appreciated that the complexity for a waveform generator approach is equal to:

Span*1X*Derivative Order, where Span is the number of symbols that the impulse response spans, and Derivative Order is the maximum derivative order chosen to approximate the impulse response with a desired accuracy.

It should be noted that if a traditional FIR approach operating at the oversampling ratio were chosen, then a 5*16 tap FIR operating at 16X the sample period would be required for EDGE mode operation. Although some implementations can reduce the number of taps to 5, the complexity of such a traditional approach would still be 5.*16*270.8333=21667 kilo-operations per seconds, i.e., still 4 times more complex than the multi-accumulator approach of the present example.

It will be appreciated that the complexity increases as the oversampling ratio increases. The oversampling clock (i.e., the output clock) is usually increased the due to the need to reduce the image frequency components and to reduce the order of the analog reconstruction filters after the digital-to-analog converters and to the need to spread the quantization noise over a wider bandwidth to increase the output signal-to-noise ratio.

However, it will be understood that with the invention, the FIR's are not required to operate at the output oversampling frequency, but at the same frequency as the input rate (e.g., at the symbol rate when used for pulse-shaping operation, or at the input rate when used for interpolation) while only the polynomial waveform generator based on a multi-accumulator structure that operates at the oversampling clock rate, allowing higher oversampling clock rates and allowing programmable output clocks without the need to change the FIR's coefficients or structure. Thus, in the invention the oversampling clock can be made programmable without the need to change any programming coefficients or adding complexity, it only requires changing the clock value.

In FIG. 1 is shown the signal processing flow arrangement 100 for producing FIR coefficients with a 6 symbol span length and with a $4^{th}$ order Derivative (as required for EDGE mode operation with pre-distortion).

As can be seen, the signal processing flow arrangement 100 has four groups of multipliers 112, 122, 132 and 142, each of which receives a respective coefficient (X1d(0) to X4d(5)) and an appropriate I symbol value Iin(n) to Iin(n−4). It will be understood that FIG. 1 shows the signal processing flow only for I symbol processing, and that a similar signal processing flow occurs for Q symbol processing. The outputs of the multipliers are applied to summation nodes 114, 124, 134 and 144, which sum the respective multiplier outputs in each group to produce the four order outputs x1d, x2d, x3d and x4d, which are applied to a multi-accumulator structure (as will be explained) which forms a polynomial waveform generator.

The operation can-therefore be described as follows:

$x1d(n)=\Sigma 5i=0\ X1d(i) \cdot Iin(i)$ $x2d(n)=\Sigma 5i=0\ X2d(i) \cdot Iin(i)$ $x3d(n)=\Sigma 5i=0\ X3d(i) \cdot Iin(i)$ $x4d(n)=\Sigma 5i=0\ X3d(i) \cdot Iin(i)$ where n is the index at the symbol rate 1X (Pulse-Shaping mode) or at the input rate FinX (Interpolation mode), and where X1d, X2d, X3d and X4d are the programmable coefficients of the first FIR, the second FIR, the third FIR and the fourth FIR respectively.

Figures 2, 3:
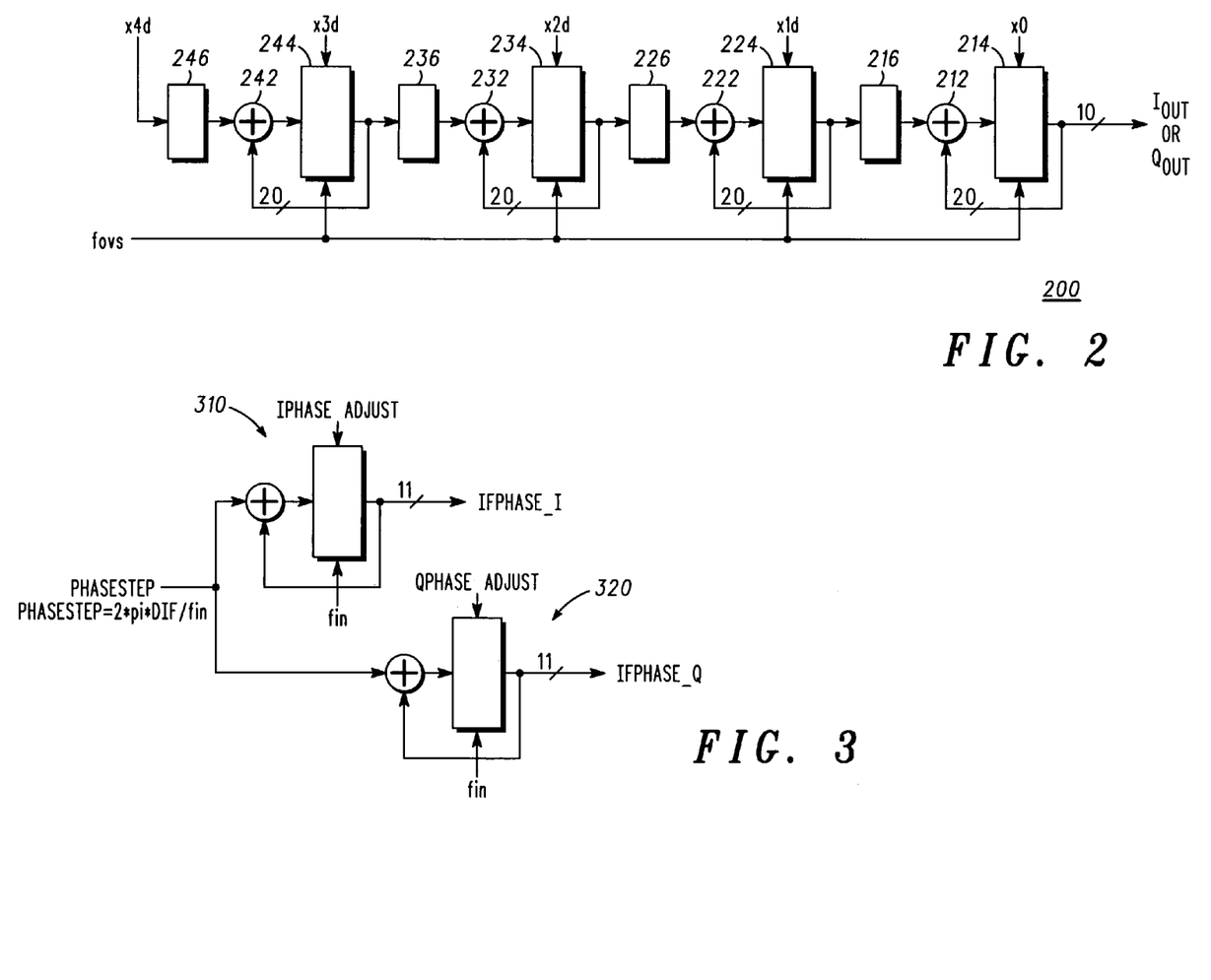
FIG. 2 shows a block schematic diagram of a multi-accumulator polynomial generator used in the multi-accumulator waveform generator.
FIG. 3 shows a block schematic diagram of a IF Phase Generator with I/Q Phase Correction which may be used in the multi-accumulator waveform generator.

Referring now also to FIG. 2, the FIR coefficients produced in FIG. 1 are applied to inputs of a polynomial waveform generator 200 operating at the system oversampling ratio OVSX, which is chosen in the present example as OVSX=16 for EDGE mode operation. In the present example a fourth order polynomial waveform generator is used.

As can be seen, the polynomial waveform generator 200 utilises the outputs x1d, x2d, x3 and x4d (together with a further set of values x0d (which are a set of programmable fixed initial values that are loaded at the start of the transmission to set an initial trajectory point and/or to compensate a DC offset value) with adders 212, 222, 232, 242, accumulator registers 214, 224, 234, 244 and shift registers 216, 226, 236, 246 (to divide by a power of 2 by right-shifting by 2, 3 or 4 bits as desired) to progressively accumulate the I (or Q) values which are output from the generator as signals Iout (or Qout).

The accumulators 244, 234, 224 load (at each symbol clock pulse at the clock rate finX) the values x3d, x2d, x1d and then accumulate (at each clock pulse at the clock rate fovs) in order to calculate the first order derivative, while the last accumulator 214 is continuously accumulating without re-initialization of its value except at the beginning of the transmission burst.

The word output Iout (or Qout) can be expressed as, (assuming a divide-by-OVSD happening in the shift registers 246, 236, 226, 216 section, and an OVSX oversampling ratio=fovs/f1x):

$$Iout(n,k) = Iout(n-1, OVSX) + k.x1d(n)/OVSD + \qquad (1)$$
$$k(k-1)/2!.x2d(n)/OVSD2 + k(k-1)(k-2)/3!.x3d(n)/OVSD3 +$$
$$k(k-1)(k-2)(k-3)/4!.x4d(n)/OVSD^4$$

Where n is the index at the symbol rate and k is the index at the oversampling rate OVSX (i.e., k=[0:OVSX−1])

Iout(0,0)=x0=initial value at the modulation start burst. x0 can include also a DC offset correction value for LO leakage reduction. For the I path x0=I_DCoffset and for the Q path x0=Q_DCoffset, these values being programmed by a host processor (not shown).

By replacing each term x1d, x2d, x3d and x4d for the fourth order system, the word output Iout (or Qout) can be re-expressed as:

$$Iout(n,k) = Iout(n-1, OVSX) + \sum 5i = \qquad (2)$$
$$0\ Iin(i).[k.X1d(i)/OVSD + k(k+1)/2!.X2d(i)/OVSD2 +$$
$$k(k-1)(k-2)/3!.3d(i)/OVSD3 +$$
$$k(k-1)(k-2)(k-3)/4!.X4d(i)/OVSD4]$$

By rewriting the equation (2) for n,n−1,n−2, . . . , then Iout can be expressed as function of Iin:

$$Iout(n,k) = Iin(n).h5(k) + Iin(n-1).h4(k) +$$
$$Iin(n-2).h3(k) + Iin(n-3).h2(k) + Iin(n-4).h1(k) +$$
$$Iin(n-5).h0(k) + Iin(n-6).h-1 + Iin(n-7).h-1 + \ldots$$

where:

-continued $$h5 = (k)[k(k-1)(k-2)(k-3)/4!.X4d(5)/OVSD^4 +$$
$$k(k-1).(k-2)/3!.X3d(5)/OVSD^3 +$$
$$k(k-1)/2.X2d(5)/OVSD^2 + k.X1d(5)/OVSD]$$

$$h4(k) = [k(k-1)(k-2)(k-3)/4!.X4d(4)/OVSD^4 +$$
$$k(k-1).(k-2)/3!.X3d(4)/OVSD^3 +$$
$$k(k-1)/2.X2d(4)/OVSD^2 + k.X1d(4)/OVSD + h5(OVSX)]$$

$$h3(k) = [k(k-1)(k-2)(k-3)/4!.X4d(3)/OVSD^4 +$$
$$k(k-1).(k-2)/3!.X3d(3)/OVSD^3 +$$
$$k(k-1)/2.X2d(3)/OVSD^2 + k.X1d(3)/OVSD + h4(OVSX)]$$

$$h2(k) = [k(k-1)(k-2)(k-3)/4!.X4d(2)/OVSD^4 +$$
$$k(k-1).(k-2)/3!.X3d(2)/OVSD^3 +$$
$$k(k-1)/2.X2d(2)/OVSD^2 + k.X1d(2)/OVSD + h3(OVSX)]$$

$$h1(k) = [k(k-1)(k-2)(k-3)/4!.X4d(1)/OVSD^4 +$$
$$k(k-1).(k-2)/3!.X3d(1)/OVSD^3 +$$
$$k(k-1)/2.X2d(1)/OVSD^2 + k.X1d(1)/OVSD + h2(OVSX)]$$

$$h0(k) = [k(k-1)(k-2)(k-3)/4!.X4d(0)/OVSD^4 +$$
$$k(k-1).(k-2)/3!.X3d(0)/OVSD^3 +$$
$$k(k-1)/2.X2d(0)/OVSD^2 + k.X1d(0)/OVSD + h1(OVSX))$$

and $$h-1 = OVSX.(OVSX-1).(OVSX-2).(OVSX-3)/$$
$$4!.\left(\sum 5i = 0X4d(i)/OVSD^4\right) +$$
$$(OVSX.(OVSX-1).(OVSX-2)/3!.\left(\sum 5i = 0X3d(i)/OVSD^3\right) +$$
$$OVSX.(OVSX-1)/2!.\left(\sum 5i = 0X2d(i)/OVSD^2\right) +$$
$$OVSX.\left(\sum 5i = 0X1d(i)/OVSD\right)$$

If Iout is expressed as a function of the required impulse response imp(t)(at oversampling ratio OVSX) to provide both modulation and pre-distorsion:

$$Iout(n,k) =$$
$$Iin(n).imp(k) + Iin(n-1).imp(k+OVSX) + Iin(n-2).imp(k+2*OVSX) +$$
$$Iin(n-3).imp(k+3*OVSX) + Iin(n-4).imp(k+4*OVSX) +$$
$$Iin(n-5).imp(k+5*OVSX) \text{ if } Iin \text{ is considered oversampled}$$

at $OVSX$ with zeros filling between $1X$ samples.

From this the following are obtained:

$h5(k)=\text{imp}(k)$ $h4(k)=\text{imp}(k+OVSX)$ $h3(k)=\text{imp}(k+2*OVSX)$ $h2(k)=\text{imp}(k+3*OVSX)$ $h1(k)=\text{imp}(k+4*OVSX)$ $h0(k)=\text{imp}(k+5*OVSX)$ (3)

By solving above equations (3), the coefficients X1d, X2d, X3d, X4d are extracted to match the impulse response.

Comparative measurements between IQ modulators utilizing the above approach and IQ modulators using the traditional prior art approach have shown significant similarity between the results of the two approaches.

It may be noted that since OVSX is chosen to be a power of 2 number, the division inside the waveform generator OVSD is performed by shifting right the bits depending on the chosen value OVSX.

It is also possible to do a non-power of 2 interpolation factor where the oversampling clock fovs is any integer number multiplier relative to the input rate finX (i.e., fovsX=FinX*OVSX), while the 246, 236, 226 and 216 values OVSD are shift right operations.

Also, it is possible to program different coefficients between the I and Q path in order to provide Image Rejection Enhancement for Direct Launch systems where greater sensitivity to I/Q gain and phase mismatch is observed at 2 GHz or above.

Also, it is possible to pre-distort the impulse response so as to compensate the subsequent analog reconstruction filters (not shown) and so as to enable a better compromise between noise output and EVM due to the selected bandwidth, i.e., lower bandwidth will lower the noise level but will increase EVM due to an increase of group and amplitude ripple.

In the case of EDGE mode operation as an example, the serial data are at 3x times the symbol rate. A phase mapping '3Π/8 O8PSK' is performed which gives 16 different phase values, commonly called "phasemod".

A Low IF mode can be selected through the software programming interface (SPI) by adding to the phasemod a linear phase increment depending on the IF value selected by a SPI programming bit. As shown in FIG. 3, the IF linear phase increment is implemented using accumulators 310 and 320 operating at 1X, having as inputs I and Q phase corrections that are programmed through SPI bits Iphaseadjust and Qphaseadjust.

The output phase(s) of the IF phase generator(s) are added to the phase mapping output phasemod to address a ROM table (not shown) to generate the cosine and sine terms on complement of 2 10-bit words, TM_I and TM_Q, at the programmed input frequency (fin) rate (normally 1X).

In Low IF mode, the I and Q outputs TM_I and TM_Q are frequency shifted by the programmed IF value, requiring then that the pulsing shaping filter be also shifted in frequency, to avoid low pass filtering the modulation that is now IF centered. To do that, a complex FIR pulse shaping is required (i.e., using complex values and replacing the real coefficients by complex coefficients, i.e., $X1dIc=X1dIr+j.X1dIi$ $X2dIc=X2dIr+j.X2dIi$ $X3dIc=X3dIr+j.X3dIi$ $X4dIc=X4dIr+j.X4dIi$ and $X1dQc=X1dQr+j.X1dQi$ $X2dQc=X2dQr+j.X2dQi$ $X3dQc=X3dQr+j.X3dQi$ $X4dQc=X4dQr+j.X4dQi$ The FIR 1X filter referred to above thus becomes a complex FIR filter, as shown in the overall block diagram of the programmable pulse-shaping complex digital IQ modulator 400 of FIG. 4.

Figure 4:
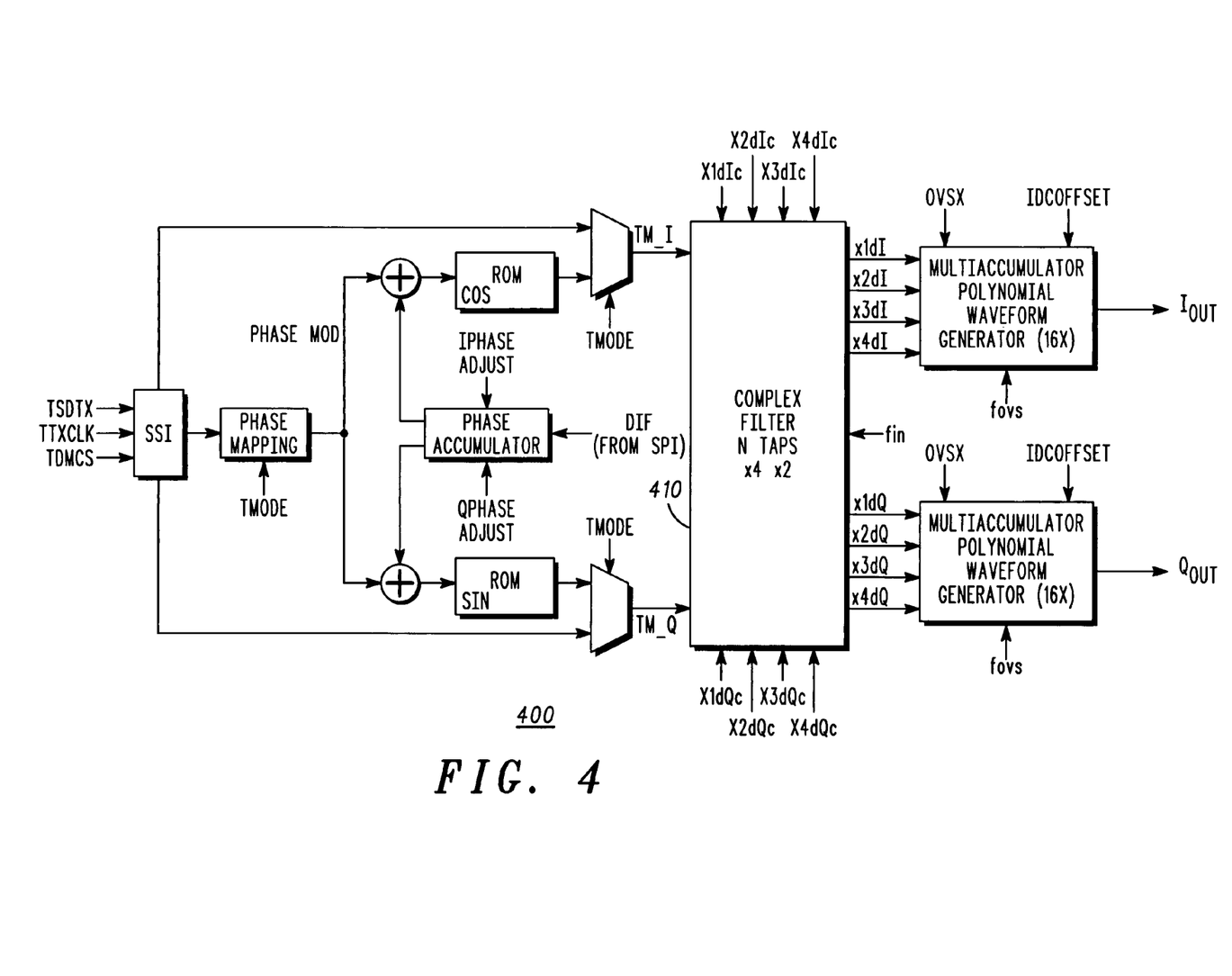
FIG. 4 shows a block schematic diagram of a Programmable Complex Pulse shaping Digital Modulator.
Figure 5:
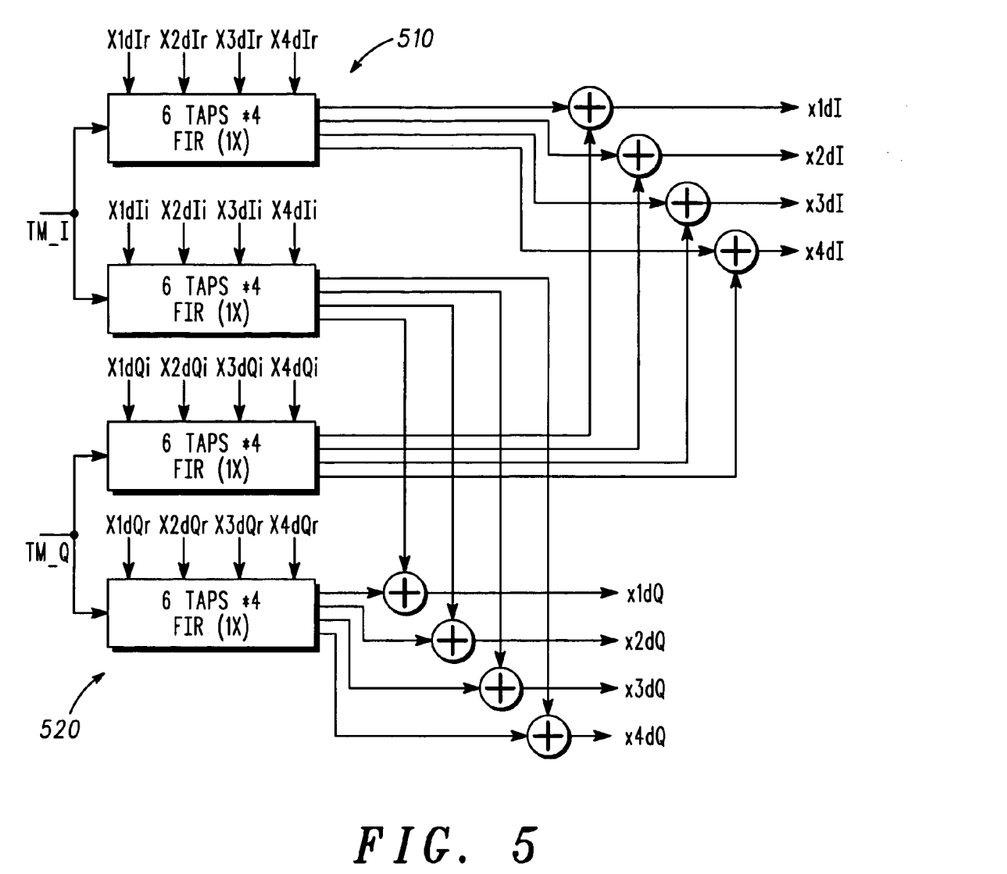
FIG. 5 shows a block schematic diagram of a complex FIR filter.

The complex FIR 410 that operates at an input frequency (fin) which is normally at 1X (i.e., at the symbol rate) is based on a real and imaginary FIR's (510 and 520 respectively), as shown in FIG. 5.

It may be noted that in IF=0 mode, the imaginary coefficients will be programmed to 0, such that real pulse shaping only is performed.

The implementation of the FIR at 1X could be optimized in die area by replacing the n multipliers operating at 1X by a single multiplier operating at n*1X, i.e., a change from parallel to serial FIR implementation. The choice of whether to implement this optimization is left to the discretion of the designer, based on the IC process speed and density.

Also, it is possible to replace the multiplier at 1X rate or n*1X rate by a ROM table (not shown) that is addressed by input Iin or Qin, if no programmability is required for the coefficients.

It will be understood that a ROM table in a traditional approach would increase in size versus the oversampling clock and would be required to change versus programming the oversampling clock, while in the case of the present invention the ROM table does not change (either it size or it contents) with the oversampling clock (since it operates at symbol rate data).

Figure 6:
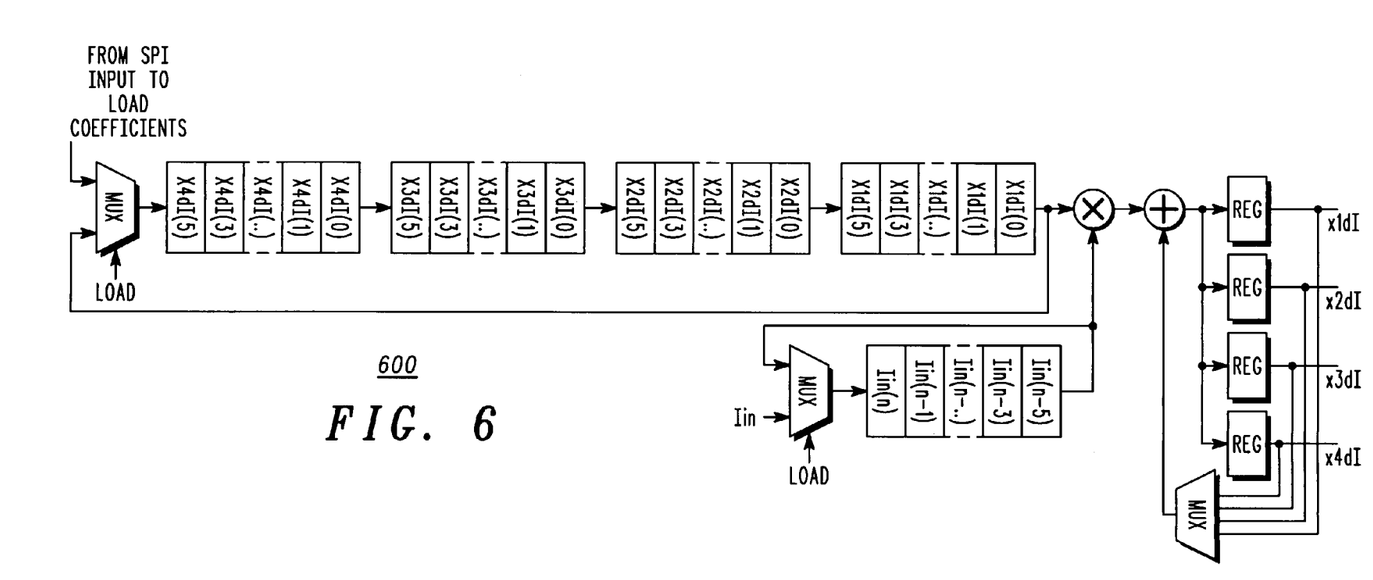
FIG. 6 shows a block schematic diagram of a particular serial implementation of the FIR of FIG. 5.

FIG. 6 shows an example of a serial (shared, multiplexed) FIR implementation 600 of 6 taps*4 FIR*1X rate which may be used an alternative to the multiple (parallel) multiplier arrangement described above.

Complex pulse shaping at 1X rate allows a Low IF mode for lower EVM by having the image shifted at Low IF and reducing LO leakage effect on EVM and having a loop injection LO (if present) non-harmonically related to the main TX frequency for additional reduction of LO re-modulation.

Also, complex pulse-shaping can pre-distort any TX IF filter group delay and amplitude for additional EVM improvement.

For EDGE for example, the reconstruction filter has some effect on the EVM of the modulation.

The impulse response could be pre-distorted for a given bandwidth setting (where no radio phasing is required). A span of 6 symbols is enough for the pre-distortion since the bandwidth of such reconstruction filters are in the range of 400–600 KHz.

It will be appreciated that, due to the presence of the multi-accumulator waveform generator, it is possible to re-use this block as an interpolator of 4th order. Since NADC mode operation requires a span over 9 symbols, rather than having to generate 9 coefficients per filter at 1X the interpolation mode as described below could be used.

In bypass mode, rather than transferring one bit serial data on TSDTX, pulse-shaped I/Q data are sent over the SSI (the modulation being performed in software) for narrow band systems. The I/Q data arrive at a rate FinX that can be programmed through a host processor. As an example, NADC I/Q data at a rate of 16X (388 kilo-data per second), and an interpolation factor of 8, results on interpolated I/Q data's of 3.1104 Mhz at the DAC input.

In the interpolation mode, the coefficients of the FIR's are programmed such that the waveform generator output fits the input at FinX and its various derivatives calculated at FinX.

Figure 7:
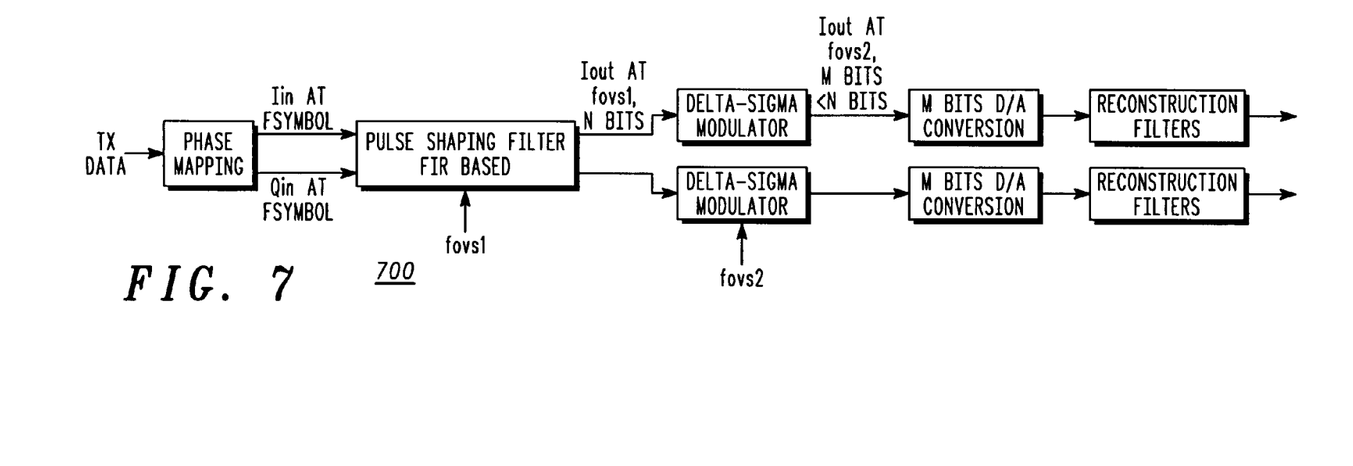
FIG. 7 shows a block schematic diagram of a TX processing portion using oversampled digital-to-analog converters using a pulse-shaping FIR filter operating at a sampling frequency less than that of the oversampled digital to analog converter.

Referring now also to FIG. 7, some digital-to-analog converters (such as the D-to-A implementation 700) have an oversampled structure called Delta-Sigma D/A's where the oversampling clock fovs2 is usually 40 to 100 times the input symbol clock. If prior art pulse shaping filter were used, the FIR multipliers would be limited in speed to fovs1 so the output word Iout1 (or Qout1) will only be oversampled at fovs1 and their associated digital quantization noise is spread only at +/−fovs1/2.

Figure 8:
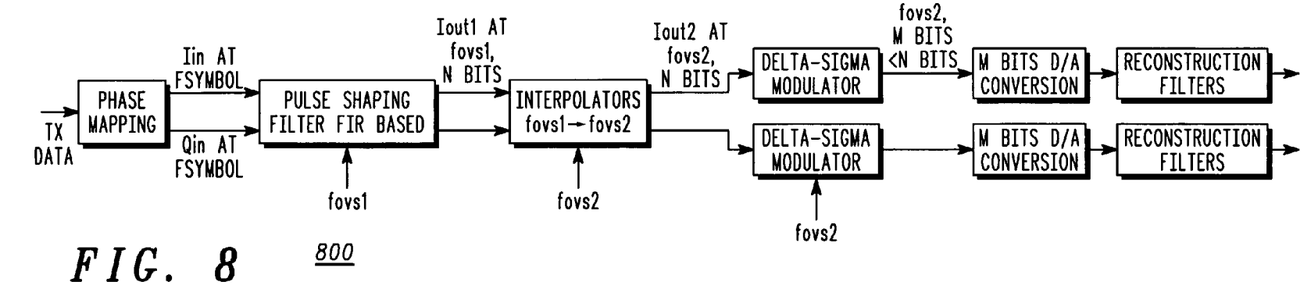
FIG. 8 shows a block schematic diagram of a further alternative TX processing portion of FIG. 7 with an interpolator added between the pulse-shaping filter and the oversampled digital-to-analog converter.

Another possible TX processing arrangement inserts interpolation stages between the pulse-shaping FIR and the Delta-Sigma Modulators as shown in FIG. 8. Such a structure as the arrangement 800 suffers however from modulation accuracy (EVM) for some MA's like EDGE, due to the nature of the interpolation structure, mainly when the interpolation factor is high (i.e., fovs2/fovs1).

Figure 9:
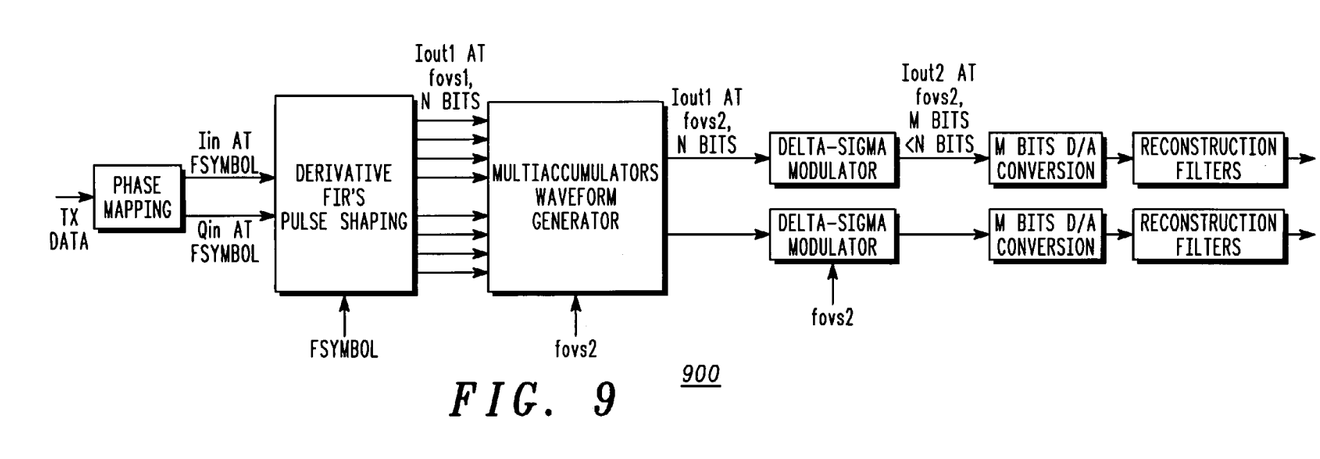
FIG. 9 shows a block schematic diagram of TX processing portion where a derivative FIR operates at the symbol rate frequency and the multi-accumulator polynomial, generator operates directly at the oversampling clock rate of the oversampled digital-to-analog converter.

Referring now to FIG. 9, to improve on the disadvantageous arrangements of FIG. 7 and FIG. 8, the present invention may make use of the IQ waveform generator processing arrangement 900, based on the above IQ waveform generator replacing the pulse-shaping FIR by first-order, second-order, etc. derivative FIR's operating at the symbol rate clock and feeding a multi-accumulators waveform generator, where the multi-accumulator waveform generator operates directly at a higher clock rate, and particularly at fovs2, similar to the Delta-Sigma Modulators clock rates, since the accumulators can operate at higher clock speeds, thus allowing the quantization noise to spread directly over +−fovs2/2 and without the need to increase complexity since the FIR's operate at the symbol rate clock. In this way, the multi-accumulator waveform generator can be used to generate oversampling I and Q directly, with an oversampling clock as high as, say, 50 to 100 times the symbol rate.

It will be appreciated that the oversample clock can be directly connected to the Delta-Sigma oversampling clock, avoiding any current drain or area size increase since no multipliers are required to operate and no loss in the modulation accuracy occurs. It will be understood that such use of the same ovesampling rate serves to spread quantisation noise and lower the noise floor.

It will be appreciated that the Complexity of the Multi-accumulator Waveform Generator is summarized as:

$C\_WG$=Span*Derivative Order*1X in multiply/add operations

The Complexity of the traditional FIR using the fact that the input is constant over a symbol is:

$C\_TFIR$=Span*Oversampling*1X in multiply/add operations

Thus, it will be understood that both approaches have the same complexity when the oversampling ratio is equal to the derivative order.

However, for a system like EDGE which requires Low EVM, an oversampling of 16 is required. A $4^{th}$ order derivative meets both the EVM and Spectral Mask, and so a ratio of ¼ of the complexity exists when using the multi-accumulator waveform generator approach described above.

Also, when oversampled digital-to-analog converters are used with oversampling clock higher than 40 times the symbol rate, the use of the multi-accumulator waveform generator reduces the complexity significantly.

The following table shows the Complexity of the Waveform Generator for various MA's:

|  | Symbol Span | Derivative Order | Over-sampling Ratio | 1x (symbol) (MHz) | C WG Multiply/ Add/Subtract | Low IF | Software Modulation & Interpolation |
|---|---|---|---|---|---|---|---|
| GSM/EDGE | 6 | 4 | 16 | 0.270833 | 6.5000 | Yes | No |
| NADC | 9 | 4 | 16 | 0.0243 | 0.8748 | No | Yes |
| WBCDMA | 16 | 4 | 8 | 3.84 | 245.7600 | No | No |
| BLUETOOTH | 2 | 4 | 16 | 1 | 8.0000 | No | No |

It will be understood that the IQ modulator and method described above provides the following advantages:
- Reduced complexity versus traditional FIR's by a factor equal to the oversampling ratio divided by the derivative order.
- Programmability to Digital Very Low IF mode TX.
- The same circuit can perform interpolation for narrow band MA's.
- Reduced sets of coefficients enables implementation of two sets of coefficients allowing for fast handover between MA's, e.g., between EDGE and IS136.

The invention claimed is:

1. An IQ modulator for modulating in-phase ('I') and quadrature-phase ('Q') components of an input signal in accordance with I and Q symbols, comprising:
   I and Q FIR means for filtering the I and Q signal components, respectively, and generating I and Q sets of FIR components (x1d–x4d) corresponding to said I and Q input signal components multiplied by sets of coefficients, said FIR means operating at the symbol rate; and
   a polynomial waveform generator comprising I and Q accumulator means, said I and Q accumulator means comprising I and Q sets of first accumulator elements and I and Q second accumulator elements, said I and Q sets of first accumulator elements being arranged to load said I and Q FIR signal components at the symbol rate and accumulate at an over-sampling rate so as to calculate first order derivatives, and said I and Q second accumulator elements being arranged to accumulate progressively, without reinitialization except at a beginning of a transmission burst, the outputs of said I and Q sets of first accumulator elements and produce therefrom I and Q signal components modulated with the I and Q symbols.

2. The IQ modulator according to claim 1 wherein the I and Q accumulator means has a programmable over-sampling ratio.

3. The IQ modulator according to claim 1 wherein the I and Q FIR means comprises multiplier means for producing a plurality of FIR filter coefficients.

4. The IQ modulator according to claim 3 wherein the I and Q FIR means comprises a plurality of multiplier arrangements for respectively producing pluralities of FIR filter coefficients.

5. The IQ modulator according to claim 3 wherein the FIR means comprises a serial multiplexed multiplier arrangement for producing the plurality of FIR filter coefficients.

6. The IQ modulator according to claim 3 wherein the FIR means comprises look-up table means for looking up from predetermined values in a look-up table values for producing the plurality of FIR filter coefficients.

7. The IQ modulator according to claim 1 further comprising digital-to-analog converter means for operating at an over-sampling rate, coupled directly after the multi-accumulator means.

8. A method of modulating in-phase ('I') and quadrature-phase ('Q') components of an input a signal in accordance with I and Q symbols, the method comprising:
   providing I and Q FIR means, filtering the I and Q signal components respectively and generating I and Q sets of FIR components corresponding to said I and Q input signal components multiplied by sets of coefficients, said FIR means operating at the symbol rate; and
   providing I and Q accumulator means, said I and Q accumulator means comprising I and Q sets of first accumulator elements and I and Q second accumulator elements, said I and Q sets of first accumulator elements loading said I and Q FIR signal components at the symbol rate and accumulating at an over-sampling rate so as to calculate first order derivatives, and said I and Q second accumulator elements being arranged to accumulate progressively, without re-initialization except at a beginning of a transmission burst, the outputs of said I and Q sets of first accumulator elements and producing therefrom the I and Q signal components modulated with the I and Q symbols.

9. The method according to claim 8 wherein the multi-accumulator means has a programmable oversampling ratio.

10. The method according to claim 8 wherein the I and Q FIR means comprises multiplier means for producing a plurality of FIR filter coefficients.

11. The method according to claim 10 wherein the FIR means comprises a plurality of multiplier arrangements for producing respective pluralities of FIR filter coefficients.

12. The method according to claim 10 wherein the FIR means comprises a serial multiplexed multiplier arrangement for producing the plurality of FIR filter coefficients.

13. The method according to claim 10 wherein the FIR means comprises look-up table means for looking up from predetermined values in a look-up table values for producing the plurality of FIR filter coefficients.

14. The method according to claim 8 further comprising providing digital-to-analog converter means operating at an over-sampling rate, coupled directly after the multi-accumulator means.

15. The IQ modulator according to claim 1 wherein said I FIR means of the I and Q FIR means comprises complex I FIR filter means including real and imaginary I FIR means, and said Q FIR means of the I and Q FIR means comprises complex Q FIR filter means including real and imaginary Q FIR means.

16. The method according to claim 8 wherein said I FIR means of the I and Q FIR means comprises complex I FIR filter means including real and imaginary I FIR means, and said Q FIR means of the I and Q FIR means comprises complex Q FIR filter means including real and imaginary Q FIR means.

* * * * *

UNITED STATES PATENT AND TRADEMARK OFFICE
CERTIFICATE OF CORRECTION

PATENT NO. : 7,158,578 B2 Page 1 of 1
APPLICATION NO. : 10/451094
DATED : October 8, 2001
INVENTOR(S) : Nadim Khlat

It is certified that error appears in the above-identified patent and that said Letters Patent is hereby corrected as shown below:

In Column 10, Line 14, Claim No. 8:

Change "input a signal" to --input signal--

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,158,578 B2  Page 1 of 1
APPLICATION NO. : 10/451094
DATED : January 2, 2007
INVENTOR(S) : Nadim Khlat It is certified that error appears in the above-identified patent and that said Letters Patent is hereby corrected as shown below:

In Column 10, Line 14, Claim No. 8:

Change "input a signal" to --input signal--

This certificate supersedes the Certificate of Correction issued May 20, 2008.

Signed and Sealed this

Seventeenth Day of June, 2008

JON W. DUDAS
*Director of the United States Patent and Trademark Office*